May 5, 1931.  J. J. HERLBAUER ET AL  1,803,389
VEHICLE TOWING DEVICE
Filed Feb. 10, 1928
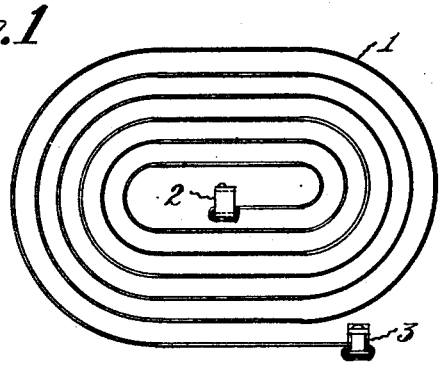
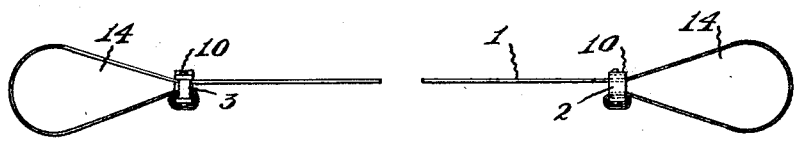
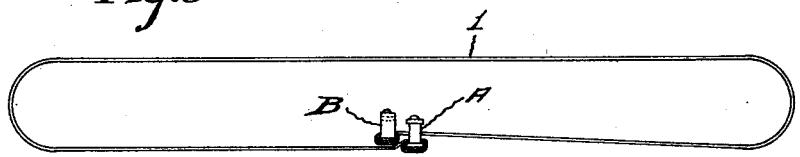
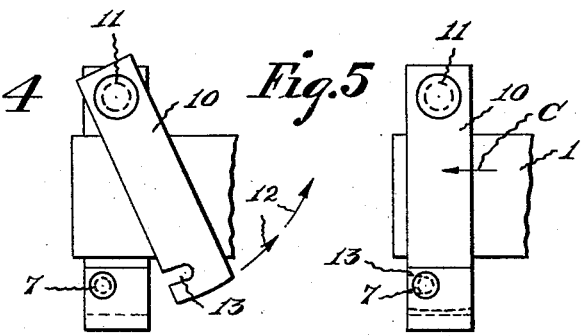
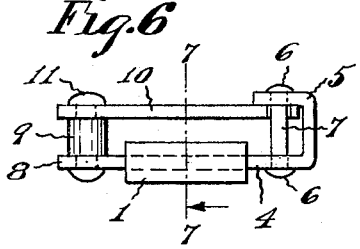
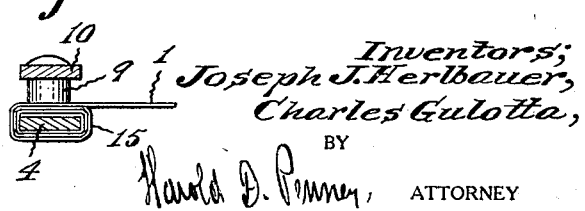

Patented May 5, 1931

1,803,389

UNITED STATES PATENT OFFICE

JOSEPH J. HERLBAUER, OF HOLLIS, AND CHARLES GULOTTA, OF NEW YORK, N. Y.

VEHICLE TOWING DEVICE

Application filed February 10, 1928. Serial No. 253,380.

Our present invention relates to an improvement in means for towing vehicles, and is more especially adapted for use in towing one automobile by another, in an emergency, where there has been a "breakdown" of one of said vehicles.

One of the main advantages of my device is the utilization of an easily storable, flexible steel band of suitable width and thickness which is rollable into a small and compact package for carrying in the tool or other spare space of an automobile.

Another advantage of our construction is in the provision of further means whereby a towing loop or hitch may be readily made between the two vehicles, such as, for instance, the rear end of a towing vehicle and the front end of the vehicle being towed, in a rapid fashion, and with ease.

Another advantage of our device is the provision of means whereby towing attachment to such vehicles may be made in the form of a single or plural loops for short or long towing connection, respectively, between the vehicles, as may be desired.

Another advantage is the provision of a simple easily operated towing band latching means whereby the towing band may be readily locked into the desired towing loop or loops, and whereby the strains of towing tend to keep the latching means in locked engagement with the loop formed on the band, such engagement being preferably in the form of a slip noose or hitch, as will be more fully explained hereinafter.

In the drawings:

Fig. 1 is a plan view of my device rolled in compact form for easy storage and carrying, and in practice it is intended that the device will be slipped into a suitable canvas carrying case or the like.

Fig. 2 is a fragmentary plan view showing the formation of towing loops at both ends of the band, for a long towing connection, the band being shown broken at the middle for convenience in showing.

Fig. 3 is a plan view showing the formation of a single closed loop for a short connection.

Fig. 4 is a plan view of the band engaging lock-latch means, enlarged, showing the latch means partly open.

Fig. 5 is a similar view showing the latch means closed.

Fig. 6 is a rear elevation of the latch means showing the band end wound thereabout for permanently affixing the latch thereto.

Fig. 7 is a sectional view of the latch taken on the line 7—7, Fig. 6, looking in the direction of the arrow.

In our present device we propose to utilize, as a towing element, a flat metallic band about one inch wide and about one-thirty second of an inch thick although these dimensions may vary, and of a tough metal which is substantially flexible, but not elastic, it being of such proportion as may be readily rolled into a tight bundle when it is not in use and stored. A packed loop of this type is disclosed in Fig. 1, wherein the metal band 1 is shown rolled in a small compact bundle and being provided at each of its ends with the latch means 2 and 3 thereon.

The band-locking latch means are more fully shown in Figs. 4 to 7 inclusive, being made of heavy, bent, strap metal of rectangular cross-section, and comprise, as shown in Fig. 6, a flat base 4 having one U-shaped end 5 thereon, the opposing ends thus formed being joined for greater strength and against collapse by a pin 7, introduced through both legs of the U-shaped portion, and being riveted over, as at 6—6.

The opposite end of the base portion 4, as at 8, is flat and unbent, and mounts thereon a shouldered stud 9, the lower reduced end of which is riveted to the end 8, the upper reduced end of which is pivotally riveted to a flat, metallic, substantially rectangular latch plate 10 as at 11, said latch plate, as shown in Fig. 4 being swingable about said point 11, as indicated by the arrows 12. The latch plate 10 is further provided with a part circular slot 13 which passes under the short upper leg of the U-shaped end 4' of the latch base 5, engages the pin 7 and acts as a locking means therewith when the latch is in operative position to form the towing loops 14—14, Fig. 2.

As a means for rigidly and permanently fixing the metallic towing strap 1 to the latches in operative position, the metal strap 1 is cut square at its ends and then tightly wound about the base portion 4 of the latch into several convolutions 15, as indicated by the sectional view, Fig. 7. Due to the rectangular shape of the said base 4 and the tightly wound contact of the towing strap 1 therewith, we have found that this is all that is necessary to permanently affix the latching means to the band 1 at either end. As a consequence of this construction any towing strains put thereon tend to cause the strap 1 to more tightly engage the base portion 4 without any tendency to pull away therefrom.

In utilizing the device, the latch plate 10 is swung in the direction of the arrows 12, Fig. 4, substantially at right angles to the latch proper and that portion of the band 1 in which it is desired to form the loops 14, is laid into the open lock and then the latch plate 10 closed thereover, as indicated at Fig. 5, thus forming the desired loops about any portion of the vehicle to be towed, and as may be desired and convenient.

When both vehicles are connected together by two slip loops 14—14, as just described, the band is then in condition to act as a towing means between the two vehicles and the strain of towing causes the two loops to become drawn tightly together, firmly engaging the portions of the vehicles to which they are attached, and thus the towed vehicle may be readily pulled by the towing vehicle. This arrangement of double end loops is fully disclosed in Fig. 2, and naturally, permits the vehicles to be separated by a considerable distance.

It sometimes happens that it is desirable to make a single, short towing line of the device, such as where it is desirable to engage some part of the towing vehicle and to possibly hook a short tow line to the hub of the vehicle to be towed, in which event, as is shown in Fig. 3, a single loop may be made by the act of engaging both ends of the towing strap into one latch member, leaving the other latch member inoperative, except to act as a means for preventing the towing band from slipping through and disengage from the operating latch. In Fig. 3, where this form of loop is shown, the operating latch in actual engagement with the strap is shown at B, and the inoperative latch acting as a means for preventing the pulling out of the other end is shown at A.

It is further to be noted that in the means of engaging, as above described, when loops 14 are formed as in Fig. 2, the towing strains incurred in the band 1 create a reaction pressure against the pivoted latch plate 10 as indicated by the arrow C, Fig. 5, thereby tending to keep the latch plate closed against the stop pin 7, thus preventing either one of the latches from accidentally opening during the operation of the device. Thus the heavier the pull the tighter the latches are locked.

Thus, it will be observed that we have devised a towing device of inexpensive material, of great strength and easily packed away when not in use, and of easy application when required for use. Modifications may be made without departing from the scope of the herein claims and parts of the invention may be used without other parts.

Having thus described our invention, what we claim is:

1. A towing device comprising a latch having a base portion provided with a U-shaped end and a pivoted latch plate on the opposite end thereof, and a flexible metallic strap having one portion coiled about said base portion.

2. A towing device comprising a latch having a base portion being provided with a pivoted latch plate on the opposite end thereof, said latch plate being pivotally spaced from said base portion by a shouldered stud, and a flexible metallic strap having one portion coiled about said base portion.

3. A towing device comprising a latch having a base portion embodying a U-shaped end, a latch plate pivotally fixed to the opposite end thereof, a latch locking pin mounted on said U-shaped portion, and a flexible metallic strap having one portion coiled about said base portion.

4. A towing device comprising a latch comprising a base portion including a U-shaped end, a latch plate pivotally affixed to the opposite end thereof, a latch locking pin mounted in said U-shaped portion, said latch plate being provided with a notch for engaging said pin, and a strap having one portion coiled about said base portion.

5. The combination of a towing band of the class described and a latch for the same, having thereon a base, a rectangular portion on said base, for winding the ends of said band thereunto, a U-shaped member, at one end of said base, and a latch plate, pivotally connected at one end thereof to the opposite end of said base and adapted at the other end thereof to engage a part on said member, thereby locking said latch, said plate in its locked position being disposed transversely to said band when the latter is taut.

Signed at New York, in the county of New York and State of New York, this eighth day of February, A. D. 1928.

JOSEPH J. HERLBAUER.
CHARLES GULOTTA.